July 12, 1949.    O. G. KOPPIUS    2,476,150
X-RAY DIFFRACTION APPARATUS
Filed Feb. 12, 1947
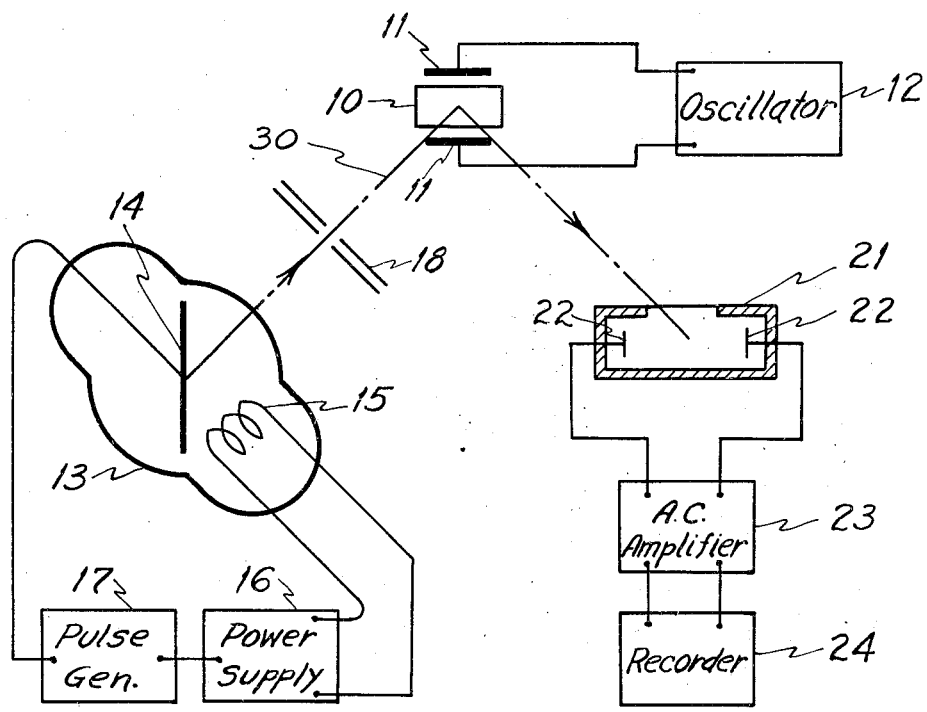
Fig. 1
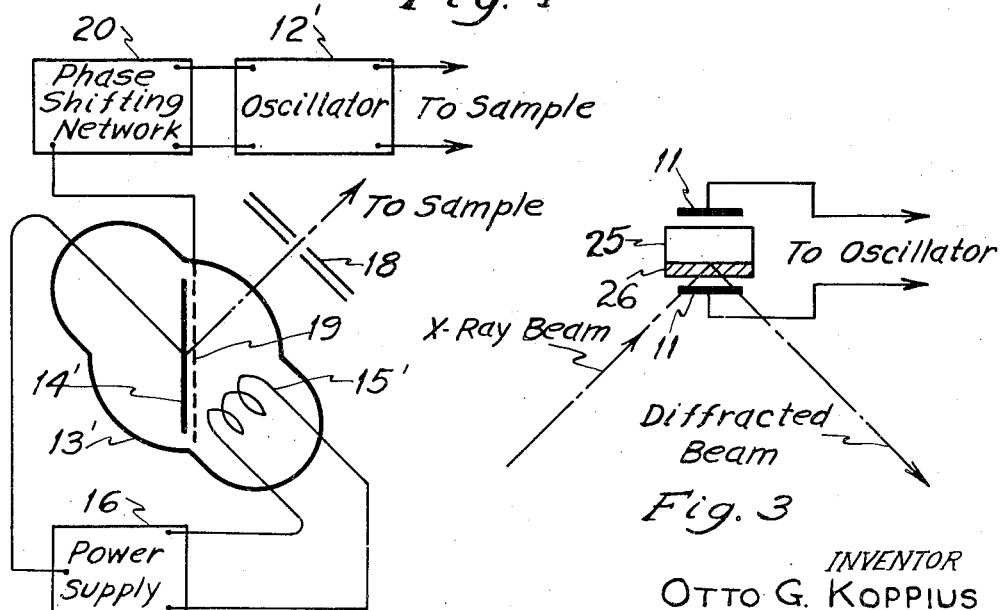
Fig. 2
Fig. 3
INVENTOR
OTTO G. KOPPIUS
BY
AGENT Patented July 12, 1949

2,476,150

UNITED STATES PATENT OFFICE 2,476,150

X-RAY DIFFRACTION APPARATUS

Otto G. Koppius, White Plains, N. Y., assignor to Philips Laboratories, Inc., Irvington on Hudson, N. Y.

Application February 12, 1947, Serial No. 728,031

13 Claims. (Cl. 250—83)

My invention relates to an X-ray apparatus and more particularly to an X-ray apparatus for and a method of analyzing the structure of materials under dynamic stress.

X-radiation has been used to detect the hidden flaws in castings, metal objects, and to determine the orientation of crystals. However, it has been generally necessary to examine the specimen in its static state. The beam of X-radiation is caused to impinge upon the object, e. g., a quartz crystal plate, and is then reflected from one or more of the atomic planes constituting the crystal lattice of the material. Since the lattice structure remains constant while the object is in a static condition, the reflected beam of X-radiation when suitably detected will reveal the spacings between atomic planes of the specimen being analyzed. These atomic reflecting planes appear as lines on a photographic film or other suitable recording medium, and the distances between these spectrum lines when properly interpreted reveal the spacings of the atomic planes within the lattice structure of the material. If the material is stressed, the lines will shift indicating that the reflecting atomic planes within the material have changed their spatial relationship within the specimen. Thus, when the specimen is strained statically, the resulting stresses within the specimen are readily detectable by means of X-ray analysis.

While such methods have yielded much valuable information concerning the internal structure of the specimen in general, they do not give a reliable indication of conditions in the specimen under dynamic stress. Thus, they do not permit the study of such familiar phenomena as the creeping of metal under heat, the distortion present in a vibrating quartz crystal plate, a shaft subjected to recurring torsional stresses, or even a simple member subjected to recurring tensional and compressional stresses.

It is an object of my invention to provide a new and novel method for analyzing the internal strains and stresses of materials which are subjected to dynamic strains and stresses.

It is a further object of my invention to provide a new and novel apparatus for detecting the internal strains occurring within a structure of a moving member and observing the internal behavior of materials under dynamic stress.

These and further objects of my invention will appear as the specification progresses.

In accordance with the invention, I have found that by employing a suitably modulated beam of X-radiation wherein the beam modulation corresponds to the periodicity of the stress when the specimen is dynamically strained, it is possible to analyze effectively the nature of dynamic stresses occurring within the specimen. When the specimen is dynamically stressed, i. e., subject to cyclically recurring stresses, the atomic planes constituting the lattice structure of the material are in a state of motion. Consequently, the spectrum lines shift in position with the movement of the atomic planes within the specimen.

Preferably the beam of X-radiation is modulated by a pulsing circuit arrangement and at a frequency which is related to the period of vibration of an oscillating specimen, i. e., a quartz crystal plate, whereby the movement of the planes can be made to coincide with the pulses of X-radiation and the stresses present within the material can be effectively studied. Furthermore by varying the phase relation between the modulated beam of X-radiation and the oscillating specimen the stresses existing throughout the distortion range of the specimen may be readily analyzed.

In order that the invention will be readily understood and carried into effect it will now be described in reference to the accompanying drawing in which like numerals refer to like parts and in which:

Fig. 1 illustrates the principle of the invention applied to a simple vibrating crystal plate.

Fig. 2 illustrates another embodiment of the invention applied to a vibrating crystal plate.

Fig. 3 illustrates one embodiment of the invention for studying a sample of material which is dynamically stressed.

Referring now more particularly to the drawing, in Fig. 1, a piezo-electric crystal 10 which is subjected to X-ray analysis, is mounted between electrodes 11—11 and is subjected to dynamic stress by coupling the same to an oscillator 12, having a frequency equal to or harmonically related to the resonant frequency of the crystal. For convenience the crystal can be selected from the X-cut variety. Waves of compression and rarefaction will spread through the crystal causing the lattice structure to be alternately compressed and stretched out of original shape. As a source of X-radiation there is provided an X-ray tube 13, having an anode 14 and a cathode 15, and an energizing power supply 16, anode 14 being connected to the high tension terminal of power supply 16 through a pulse generating circuit 17 operated in synchronism with the oscillator 12. The pulse generating circuit conforms to those well-known in the art and a detailed description thereof is not deemed necessary for the proper understanding of the invention; however, it may be in the form of a synchronously operated switch. A beam of X-radiation, generated by the tube 13 is reduced to a narrow pencil of X-radiation 30 by collimating slits 18 and impinges upon the activated crystal 10. Within the crystal 10 the said beam is reflected by one of the atomic planes constituting the lattice structure of the crystal element and upon emerging therefrom, the reflected beam is caused to enter an ionization chamber 21. The resulting ionization current in the tube 21 has a pulsating component because of the pulsating nature of the impinging X-radiation, which is applied by electrodes 22—22 to a conventional amplifier 23, and impressed on an X-ray recorder 24 of any of the types well-known in the art. In accordance with the preferred arrangement according to the invention, the X-ray beam is modulated at a frequency which is proportional to the cyclical rate of vibration of the crystal whereby the periodic strains occurring within the specimen can thus be readily observed.

In Fig. 2, I have shown another embodiment of my invention wherein X-ray tube 13' having an anode 14' and a cathode 15' is provided with a control electrode 19 in the form of a grid or wire mesh. Control electrode 19 is energized from oscillator 12' which energizes the sample to be studied. By connecting the control electrode 19 to the oscillator 12' through phase shifting network 20, a phase displacement of the voltage applied to the control grid relative to the voltage applied to the sample may be obtained, whereby the relative phase between the modulated beam of X-radiation and the oscillating crystal may be varied. Under these conditions it is thereby possible to analyze shifting strains within the lattice structure of the specimen.

In Fig. 3, there is shown an embodiment of my invention for analyzing the interior behavior of a crystalline material which does not possess piezo-electric properties. In this particular embodiment the specimen is mounted on piezo-electric crystal which is mounted in a set of electrodes and excited by a potential which is applied from the oscillator. While this is a particular example of mounting a specimen for analysis, the invention is equally applicable to any specimen which possesses crystalline properties and which is subjected to recurrent stresses and strains.

From the foregoing it will be seen that I have provided a simple and highly sensitive method of and apparatus for determining and analyzing dynamic stress in a crystalline material. More particularly, because the impinging X-radiation is of a recurrent cyclic nature, the reflected beam is readily amplified by conventional amplifiers of high gains, thereby obviating the need of complex highly sensitive X-ray detection apparatus. Furthermore, since the X-radiation is pulsed, any point in the cyclic distortion of the sample can be studied by phase shifting adjustment.

While I have thus described my invention with specific examples and applications it will be obvious to those skilled in the art that various modifications therefore can be made without departing from the spirit and scope of my invention.

What I claim is:

1. The method of studying the internal behavior of crystalline materials subject to changing internal stresses comprising the steps of, cyclically modulating a beam of X-radiation at a frequency harmonically related to the rate of change of stress within said crystalline material, directing the modulated beam of X-radiation at the material, and analyzing the beam after said beam emerges from the material.

2. The method of studying the internal behaviour of crystalline materials under dynamic stress comprising the steps of, straining the crystalline material to produce cyclically recurring stresses within the material, cyclically modulating a beam of X-radiation at a rate harmonically related to the change in stress within said material, directing said modulated beam of X-radiation at said stressed material, and analyzing the beam of X-radiation after said beam emerges from the stressed material.

3. The method of studying the internal behaviour of crystalline materials under dynamic stress comprising the steps of, straining the material to produce cyclically recurring stresses within the material, modulating a beam of X-radiation at a frequency which is harmonically related to the cyclical recurrence of the stresses within the material, directing said modulated beam of X-radiation at said stressed material, and analyzing the beam of X-radiation after said beam emerges from the stressed material.

4. The method of studying the internal behaviour of crystalline materials under dynamic stress comprising the steps of, straining the material to produce cyclically recurring stresses within the material, cyclically modulating a beam of X-radiation at a frequency which is harmonically related to the cyclical recurrence of stresses within the material, directing said cyclically modulated beam of X-radiation at said material in controlled phase displacement with respect to said cyclically recurring stresses, and analyzing the beam of X-radiation after said beam emerges from said stressed material.

5. The method of studying the internal behaviour of crystalline materials under dynamic stress comprising the steps of, mounting a specimen of material on a piezoelectric crystal, applying a cyclically recurrent potential to said crystal, applying said cyclically recurrent potential to a control electrode of an X-ray generator in controlled phase displacement with respect to said potential applied to the crystal, generating a beam of X-radiation modulated by said cyclically recurrent potential applied to said electrode, directing said modulated beam of X-radiation at said specimen, and analyzing said beam of X-radiation after said beam emerges from said specimen.

6. A device for studying the internal behaviour of crystalline materials under cyclically recurring stresses comprising an X-ray generator, means to produce an X-ray beam modulated at a frequency which is harmonically related to the frequency of said recurring stresses, means to impress said modulated beam on the crystalline material, and means for analyzing said beam after the beam emerges from said crystalline material.

7. A device for studying the internal behaviour of crystalline materials under cyclically recurring stresses comprising an X-ray generator, means to cyclically energize said X-ray generator to produce an X-ray beam modulated at a frequency which is harmonically related to the frequency of said recurring stresses, means to impress said modulated beam on the crystalline material, and means for analyzing said beam after the beam emerges from said crystalline material.

8. A device for studying the internal behaviour of crystalline materials subject to varying internal stresses comprising an X-ray generator having a control element, means to energize said X-ray generator, means to apply a cyclically recurrent potential having a frequency which is harmonically related to the cyclical recurrence of the strains in said material to said control element for modulating a beam of X-radiation, a collimator for directing a well-defined beam of X-radiation at the material, and means for analyzing the beam of X-radiation after said beam emerges from the material.

9. A device for studying the internal behaviour of crystalline materials under dynamic stress comprising means to produce cyclically recurrent stresses in said material, an X-ray generator having a control element for generating a modulated beam of X-radiation, means for energizing said X-ray generator, means for applying a cyclically recurrent potential having a frequency which is harmonically related to the cyclical recurrence of the strains in said material to said control element for producing a modulated beam of X-radiation, a collimator for directing a well-defined beam of X-radiation at said material, and means for analyzing the beam of X-radiation after the beam emerges from the material.

10. A device for studying the internal behaviour of crystalline materials under dynamic stress comprising means to produce cyclically recurrent stresses in the material, an X-ray tube having anode and cathode electrodes, means to energize said electrodes, pulse generating means for applying a cyclically recurring potential having a frequency which is harmonically related to the cyclical recurrence of the strains in said material to said anode electrode for producing a pulsed beam of X-radiation, a collimator for directing a well defined beam of X-radiation at the material, and means for analyzing the beam of X-radiation after said beam emerges from the material.

11. A device for studying the internal behaviour of crystalline materials under dynamic stress comprising means to produce cyclically recurring stresses in said material, an X-ray tube for generating a beam of X-radiation having a control electrode, means to energize said X-ray tube, means for applying a cyclically recurring potential having a frequency which is harmonically related to the cyclical recurrence of the strains in said material to said control electrode for modulating the beam of X-radiation generated by said tube, a collimator for directing a well-defined beam of X-radiation at the material, and means for analyzing the beam of X-radiation after said beam of X-radiation emerges from the material.

12. A device for studying the internal behaviour of crystalline materials under dynamic stress comprising means to produce cyclically recurring stresses in said material, an X-ray tube having a control electrode for generating a beam of X-radiation, means to energize said X-ray tube, means to apply a cyclically recurring potential having a frequency which is harmonically related to the cyclical recurrence of strains in said material to said control electrode, a phase displacement element for controlling the relative phase displacement between said cyclically recurring potential and said recurring stresses in the material, a collimator for directing a well-defined beam of X-radiation at the material, and means for analyzing the beam of X-radiation after said beam emerges from the material.

13. A device for studying the internal behaviour of crystalline materials under dynamic stress comprising a piezo-electric crystal element for imparting a cyclically recurrent strain to said material, an X-ray generator having a control element, means for energizing said X-ray generator, means for applying a cyclically recurrent potential having a frequency which is harmonically related to the cyclical recurrence of strains in said material to said control element for generating a modulated beam of X-radiation and to said crystal, a phase displacement element for controlling the relative phase displacement between the potentials applied to said control element and said crystal, a collimator for directing a well defined beam of X-radiation at the material, and means for analyzing the beam of X-radiation after said beam emerges from the material.

OTTO G. KOPPIUS.

REFERENCES CITED

The following references are of record in the file of this patent:

UNITED STATES PATENTS

| Number | Name | Date |
| --- | --- | --- |
| 2,377,862 | Bond | June 12, 1945 |
| 2,386,785 | Friedman | Oct. 16, 1945 |